(12) United States Patent
Yoon et al.

(10) Patent No.: US 8,548,201 B2
(45) Date of Patent: Oct. 1, 2013

(54) APPARATUS AND METHOD FOR RECOGNIZING IDENTIFIER OF VEHICLE

(75) Inventors: Ho Sub Yoon, Daejeon (KR); Kyu Dae Ban, Mungyeong (KR); Young Woo Yoon, Daejeon (KR); Woo Han Yun, Daejeon (KR); Do Hyung Kim, Daejeon (KR); Jae Yeon Lee, Daejeon (KR); Jae Hong Kim, Daejeon (KR); Su Young Chi, Daejeon (KR); Joo Chan Sohn, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 122 days.

(21) Appl. No.: 13/224,178

(22) Filed: Sep. 1, 2011

(65) Prior Publication Data
US 2012/0057756 A1    Mar. 8, 2012

(30) Foreign Application Priority Data

Sep. 2, 2010   (KR) .................. 10-2010-0086215
Dec. 2, 2010   (KR) .................. 10-2010-0122186

(51) Int. Cl.
*G06K 9/00*   (2006.01)
(52) U.S. Cl.
USPC ........................................ 382/105
(58) Field of Classification Search
None
See application file for complete search history.

(56) References Cited

U.S. PATENT DOCUMENTS

| 7,734,097 B1* | 6/2010 | Porikli et al. ............... 382/190 |
| 2006/0147087 A1* | 7/2006 | Goncalves et al. .......... 382/103 |
| 2007/0058856 A1* | 3/2007 | Boregowda et al. ......... 382/159 |

FOREIGN PATENT DOCUMENTS

KR   1020100033331 A   3/2010

OTHER PUBLICATIONS

Ho-Sub Yoon; Hong-Chang Lee; and Jae-Yeon Lee, "Automatic Number Plate Detection for Korean Vehicles", Nov. 24-26, 2009, ACM.*

* cited by examiner

*Primary Examiner* — Samir Ahmed
*Assistant Examiner* — Siamak Harandi

(57) ABSTRACT

The present invention detects a candidate ROI group associated with character strings/figure strings on the basis of a result acquired through prior learning of various types of license plates, verifies the interested region candidate group detected by using at least one condition of five predetermined conditions, and determines an MBR region in the selected ROI region from the verified interested region candidate group by considering a ratio between the height and width of the ROI region to recognize the license plate for the automobile. According to the present invention, it is possible to automatically detect the location of the license plate regardless of various types of license plate specifications defined for each of countries.

20 Claims, 7 Drawing Sheets

FIG. 6
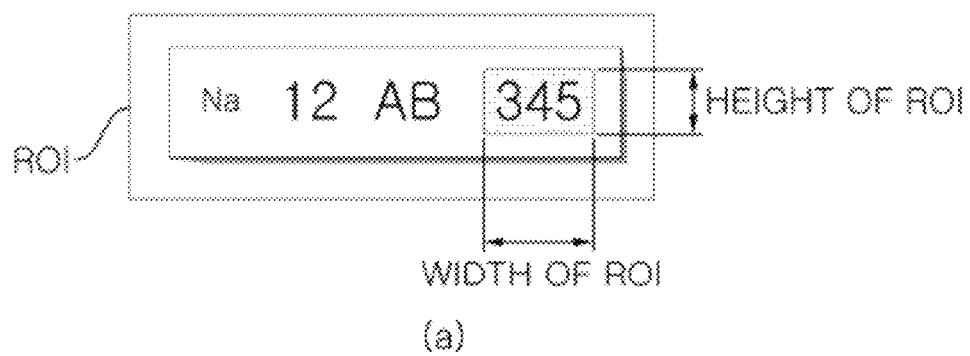
(a)
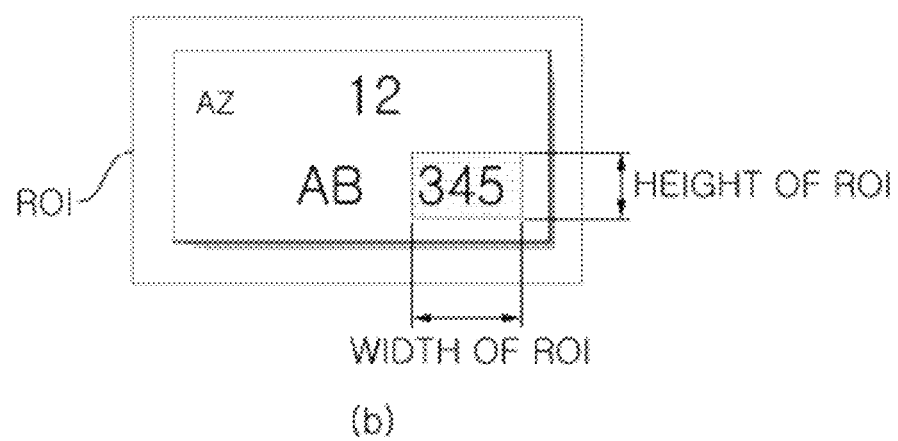
(b)

APPARATUS AND METHOD FOR RECOGNIZING IDENTIFIER OF VEHICLE

CROSS-REFERENCE TO RELATED APPLICATIONS

This application claims priority to and the benefit of Korean Patent Applications No. 10-2010-0086215 and 10-2010-0122186 filed in the Korean Intellectual Property Office on Sep. 2, 2010, and Dec. 2, 2010, the entire contents of which are incorporated herein by reference.

BACKGROUND OF THE INVENTION

1. Field of the Invention

The present invention relates to an apparatus and a method for recognizing an identifier of a vehicle. More particularly, the present invention relates to an apparatus and a method for recognizing a license plate for an automobile as an identifier of a vehicle on the basis of character strings and figure strings of the license plate for an automobile.

2. Description of the Related Art

An intelligent transport system (ITS) as a technology generalized in modern times provides a lot of services such as signal system adjustment, car parking/stopping management, speed violation, criminal vehicle management, and the like by using diversified sensors and a technology of recognizing a license plate for an automobile even in Korea.

However, as a known method of extracting character regions of the license plate for the automobile which has been developed in Korea, a method of detecting a candidate region of the license plate for the automobile on the basis of the size and specification of the license plate regulated in Korea is used. Therefore, a program should be again developed according to a new specification in order to apply the extracting technology of the character regions of the license plate which has bee developed in Korea to diversified license plates of other countries.

SUMMARY OF THE INVENTION

The present invention has been made in an effort to provide an apparatus and a method having advantages of detecting an ROI candidate group associated with character strings/figure strings by using a result acquired through prior learning of various types of vehicle identifiers and recognizing an identifier of a vehicle on the basis of the detected candidate group.

An exemplary embodiment of the present invention provides an apparatus for recognizing an identifier of a vehicle, the apparatus including: an ROI detecting unit detecting ROIs from an input image on the basis of a prior learning result by images for training; an identifier region selecting unit selecting an identifier region including the identifier of the vehicle from ROIs detected according to a predetermined criterion; and an identifier recognizing unit analyzing the identifier region selected according to a type of the selected identifier region to recognize the vehicle identifier.

The apparatus may further include a training image analyzing unit generating a common data region including common data among training images as the prior learning result by analyzing the training images which are different in at least one component of the content, location, and size of the identifier. The training image analyzing unit may include: a common data region defining portion comparing and analyzing the training images which are different in the components and defining a common data region including characters or figures; a common data region extracting portion extracting the common data region defined for each of the training images; a feature component extracting portion extracting a feature component from the extracted common data region; and a prior learning result generating portion generating the prior learning result including successive character strings or successive figure strings on the basis of the extracted feature component. The common data region extracting portion may extract common data regions defined as different sizes for each of the training images and thereafter, normalize the sizes of the extracted common data regions to transmit the common data region extracted by the feature component extracting portion. The training image analyzing unit may further include a background region processing portion extracting the background region without the common data region extracted for each of the training images and normalizing the size of the extracted background region.

The ROI detecting unit detects 2 to 5 ROIs for each input image.

The identifier region selecting unit may include: a score allocating portion allocating a score to each of the detected ROIs according to a predetermined criterion; and a region selecting portion selecting the identifier region from the detected ROIs on the basis of the allocated score. The score allocating portion may include at least one score allocating portion of a first score allocating portion allocating the score to each of the detected ROIs by considering the relationship between a data region including data and a background region without data; a second score allocating portion generating a histogram related to brightness for each detected ROI and allocating the score for each detected ROI according to a distance difference between peaks in the generated histogram; and a third score allocating portion granting a weight value for each of features displaying the data region through the prior learning by the training images and reflecting the weight value to the extracted features for each detected ROI to allocate the score. The first score allocating portion includes at least one allocating portion of a first allocating portion allocating the score by calculating a region discriminating value between the data region and the background region; a second allocating portion acquiring a first center point of the data region and a second center point of the background region and comparing a distance difference between a third center point of an ROI including the data region and the background region and the first center point and a distance difference between the third center point and the second center point with each other to allocate the score; a third allocating portion acquiring a first average distance value between a first center pixel positioned at the center of the data region and at least one adjacent pixel positioned adjacent to the first center pixel and comparing the acquired first average distance value and the second average distance value previously determined through the prior learning by the training images with each other to allocate the score; and a fourth allocating portion acquiring a third average distance value between a second center pixel positioned at the center of the background region and at least one adjacent pixel positioned adjacent to the second center pixel and comparing the acquired third average distance value and the second average distance value with each other to allocate the score.

The ROI detecting unit may determine the size of an ROI to be detected by considering a ratio of a predetermined width value and a predetermined height value at the time of detecting the ROI.

The region selecting portion may include: a temporary identifier region detecting portion detecting a temporary identifier region depending on whether data regions having the same size are sequentially present by performing labeling for each detected ROI on the basis of the allocated score or detecting the temporary identifier region depending on whether all successive data are included on the basis of a brightness value of the background region for each detected ROI on the basis of the allocated score; and a region determining portion determining the identifier region depending on whether or not the detected temporary identifier region coincides with a predetermined criterion. The apparatus may further include an image inverting unit inverting the input image when the identifier region which coincides with the predetermined criterion is not determined. The apparatus may further include an identifier region generating unit combining the temporary identifier region selected by the temporary identifier region detecting portion and the temporary identifier region acquired by signal-processing the input image with each other to generate the identifier region when the identifier region which coincides with the predetermined criterion is not selected from the inverted image.

The apparatus may further include an identifier region type determining unit determining the type of the selected identifier region by considering a ratio between a width value and a length value of the selected identifier region.

The identifier recognizing unit may include: a component identifying portion identifying data positioned in the identifier region selected according to the type of the selected identifier region into at least two types of components; and a vehicle identifier recognizing portion recognizing the vehicle identifier by using the identified components. The component identifying portion identifies the data into a character string component and a figure string component, and the vehicle identifier recognizing portion compares each of the identified components with previously stored components to recognize the vehicle identifier.

Another exemplary embodiment of the present invention provides a method for recognizing an identifier of a vehicle, the method including: detecting ROIs from an input image on the basis of a prior learning result by images for training; selecting unit selecting the identifier region including the identifier of the vehicle from ROIs detected according to a predetermined criterion; and analyzing the identifier region selected according to a type of the selected identifier region to recognize the vehicle identifier.

The method may further include generating a common data region including common data among training images as the prior learning result by analyzing the training images which are different in at least one component of the content, location, and size of the identifier. The analyzing of the training image may include: comparing and analyzing the training images which are different in the components and defining a common data region including characters or figures; extracting the common data region defined for each of the training images; extracting a feature component from the extracted common data region; and generating the prior learning result including successive character strings or successive figure strings on the basis of the extracted feature component. In the extracting of the common data region, the defined common data regions having different sizes for each of the training images may be extracted and the size of the extracted common data region may be normalized. The analyzing of the training image may further include extracting the background region without the common data region extracted for each of the training images and normalizing the size of the extracted background region.

In the detecting of the ROI, 2 to 5 ROIs may be detected for each input image.

The selecting of the identifier region may include: allocating a score to each of the detected ROIs according to a predetermined criterion; and selecting the identifier region from the detected ROIs on the basis of the allocated score. In the allocating of the score, at least one of first score allocating of allocating the score to each of the detected ROIs by considering the relationship between a data region including data and a background region without data; second score allocating of generating a histogram related to brightness for each detected ROI and allocating the score for each detected ROI according to a distance difference between peaks in the generated histogram; and third score allocating of granting a weight value for each of features displaying the data region through the prior learning by the training images and reflecting the weight value to the extracted features for each detected ROI to allocate the score may be performed. In the first score allocating, at least one of first allocating of allocating the score by calculating a region discriminating value between the data region and the background region; second allocating of acquiring a first center point of the data region and a second center point of the background region and comparing a distance difference between a third center point of an ROI including the data region and the background region and the first center point and a distance difference between the third center point and the second center point with each other to allocate the score; third allocating of acquiring a first average distance value between a first center pixel positioned at the center of the data region and at least one adjacent pixel positioned adjacent to the first center pixel and comparing the acquired first average distance value and the second average distance value previously determined through the prior learning by the training images with each other to allocate the score; and fourth allocating of acquiring a third average distance value between a second center pixel positioned at the center of the background region and at least one adjacent pixel positioned adjacent to the second center pixel and comparing the acquired third average distance value and the second average distance value with each other to allocate the score may be performed.

In the detecting of the ROI, the size of an ROI to be detected may be determined by considering a ratio of a predetermined width value and a predetermined height value at the time of detecting the ROI.

The selecting of the region may include: temporary identifier region detecting of detecting a temporary identifier region depending on whether data regions having the same size are sequentially present by performing labeling for each detected ROI on the basis of the allocated score or detecting the temporary identifier region depending on whether all successive data are included on the basis of a brightness value of the background region for each detected ROI on the basis of the allocated score; and region determining of determining the identifier region depending on whether or not the detected temporary identifier region coincides with a predetermined criterion. The method may further include image inverting of inverting the input image when the identifier region which coincides with the predetermined criterion is not determined. The method may further include identifier region generating of combining the temporary identifier region selected by the temporary identifier region detecting portion and the temporary identifier region acquired by signal-processing the input image with each other to generate the identifier region when the identifier region which coincides with the predetermined criterion is not selected from the inverted image.

The recognizing of the vehicle identifier may further include identifier region type determining of determining the type of the selected identifier region by considering a ratio between a width value and a length value of the selected identified region.

The recognizing of the identifier may include: component identifying of identifying data positioned in the identifier region selected according to the type of the selected identifier region into at least two types of components; and vehicle identifier recognizing of recognizing the vehicle identifier by using the identified components. In the component identifying, the data may be identified into a character string component and a figure string component, and in the vehicle identifier recognizing, each of the identified components may be compared with previously stored components to recognize the vehicle identifier.

According to exemplary embodiments of the present invention, a method of firstly extracting successive figure strings or successive character strings which are commonly present in all types of license plates and detecting the entire license plate region which coincides with a license plate specification of each of countries on the basis of locations of the extracted character strings is disclosed. According to the disclosed method, it is possible to automatically detect the location of the license plate regardless of various types of license plate specifications defined for each of countries.

According to the configuration of the present invention, by disclosing a method of defining an ROI which is constantly present in various types of license plates which exist in each country and extracting the defined ROI through an adaboosting technique, it is possible to easily find an automobile license plate even depending on a complicated vehicle taillight or a background region unlike the existing license extracting method using a signal processing technique. Further, it is possible to shorten an execution time by removing a candidate license plate region through an ROI verifying method. In addition, it is possible to acquire high license plate extracting rate by combining the ROI verifying method with the existing license plate extracting method. In the present invention, by using modified censors transform (MCT) which is robust to an illumination change as an adaboosting feature value, the MCT can be robustly applied to an inputted license plate image under various illumination states.

BRIEF DESCRIPTION OF THE DRAWINGS

FIG. 6 is a diagram showing an ROI considering a height and a width in an European automobile license plate.

DETAILED DESCRIPTION OF THE EMBODIMENTS

Figure 1:
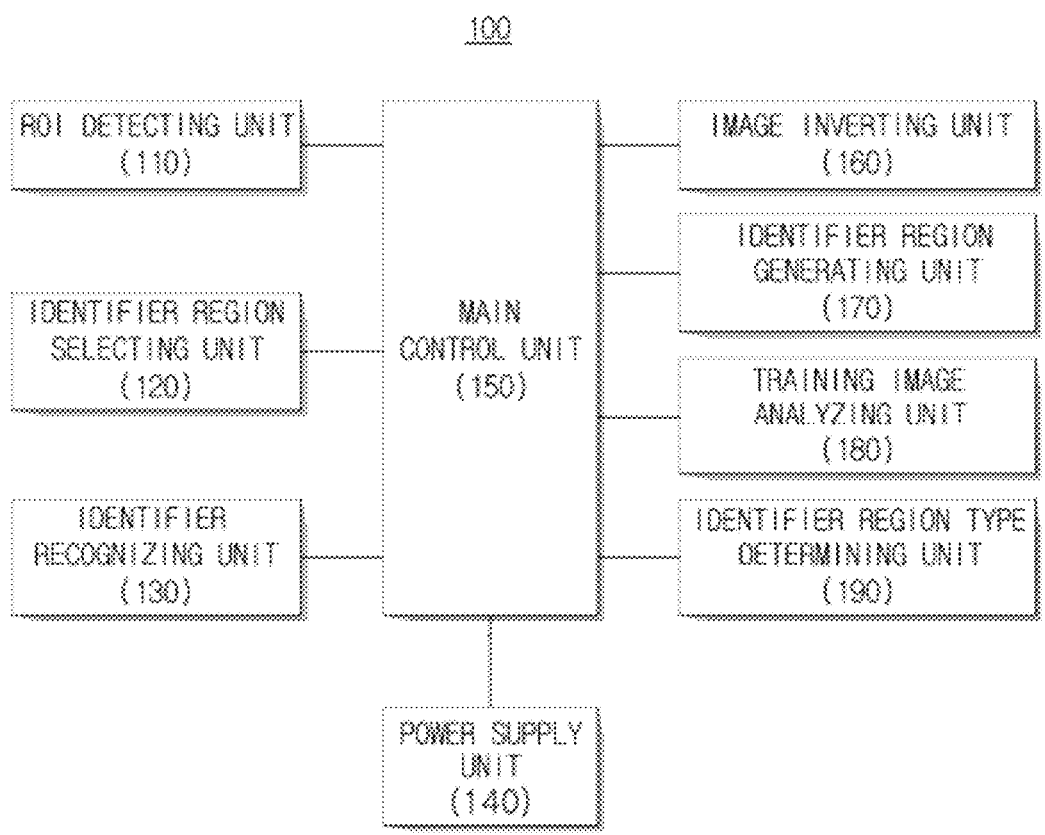
FIG. 1 is a schematic block diagram of an apparatus for recognizing an identifier of a vehicle according to an exemplary embodiment of the present invention.

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. Further, in describing the present invention, well-known functions or constructions will not be described in detail since they may unnecessarily obscure the understanding of the present invention. Hereinafter, the preferred embodiment of the present invention will be described, but it will be understood to those skilled in the art that the spirit and scope of the present invention are not limited thereto and various modifications and changes can be made.

Figure 2:
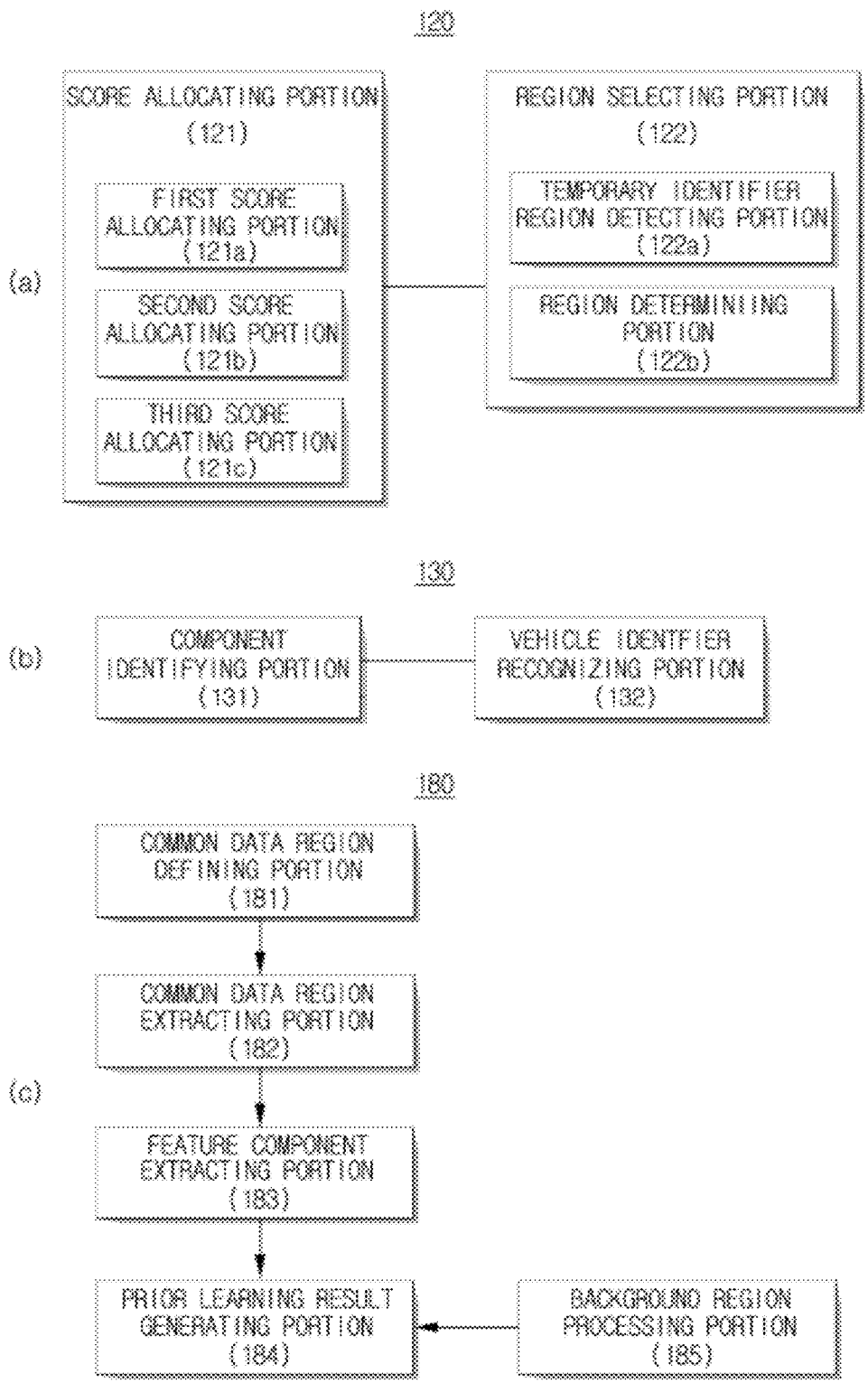
FIG. 2 is a block diagram showing a detailed configuration of components of the apparatus for recognizing an identifier of a vehicle according to an exemplary embodiment of the present invention.

FIG. 1 is a schematic block diagram of an apparatus for recognizing an identifier of a vehicle according to an exemplary embodiment of the present invention. FIG. 2 is a block diagram showing a detailed configuration of components of the apparatus for recognizing an identifier of a vehicle according to an exemplary embodiment of the present invention. The following description refers to FIGS. 1 and 2.

Referring to FIG. 1, the vehicle identifier recognizing apparatus 100 includes an ROI detecting unit 110, an identifier region selecting unit 120, an identifier recognizing unit 130, a power supply unit 140, and a main control unit 150.

The vehicle identifier recognizing apparatus 100 recognizes a license plate of an automobile on the basis of character strings/figure strings of the license plate for the automobile. The vehicle identifier recognizing apparatus 100 detects an ROI candidate group associated with character strings/figure strings on the basis of a result acquired through prior learning of various types of license plates, verifies the detected ROI candidate group detected by using at least one condition of five predetermined conditions, and determines a license plate minimum bounding rectangle (MBR) region in the selected ROI region from the verified ROI candidate group by considering a ratio between the height and width of the ROI region to recognize the license plate for the automobile.

Preferably, the vehicle identifier recognizing apparatus 100 separates the character strings and the figure strings from each other according to a license plate type determined on the basis of a ratio between the width and the length of the license plate candidate region and determines a license plate minimum bounding rectangle (MBR) region in the selected ROI region from the verified ROI candidate group by considering the ratio between the height and width of the ROI region to recognize the license plate for the automobile.

The ROI detecting unit 110 detects ROIs from an input image on the basis of a prior learning result by images for training. The detected ROI as an ROI including at least one datum includes characters or figures as data.

The ROI detecting unit 110 detects 2 to 5 ROIs for each input image. In the exemplary embodiment, the ROI detecting unit 110 detects two or more ROIs for each input image in order to increase a possibility that the identifier of the vehicle will be included in the detected ROIs. Further, the ROI detecting unit 110 detects 5 or less ROIs for each input image in order to shorten the amount of time used to select an identifier region, that is, to improve a processing speed on the apparatus. Taken together, in the exemplary embodiment, the ROI detecting unit 110 preferably detects 2 to 5 ROIs for each input image.

The ROI detecting unit 110 determines the size of an ROI to be detected by considering a ratio of a predetermined width value and a predetermined height value at the time of detecting the ROI.

The identifier region selecting unit 120 selects the identifier region including the identifier of the vehicle from ROIs detected according to a predetermined criterion. The identifier region selecting unit 120 includes a score allocating portion 121 and a region selecting portion 122 as shown in FIG. 2A.

The score allocating portion 121 allocates a score to each of the ROIs detected according to the predetermined criterion. The score allocating portion 121 includes at least one score allocating portion of a first score allocating portion 121a, a second score allocating portion 121b, and a third score allocating portion 121c.

The first score allocating portion 121a allocates the score to each of the detected ROIs by considering the relationship between a data region including data and a background region without data. In the above description, data means characters, figures, and the like. The first score allocating portion 121a includes at least one allocating portion of a first allocating portion, a second allocating portion, a third allocating portion, and a fourth allocating portion. The first allocating portion allocates the score by calculating a region discriminating value between the data region and the background region. The second allocating portion acquires a first center point of the data region and a second center point of the background region and compares a distance difference between a third center point of an ROI including the data region and the background region and the first center point and a distance difference between the third center point and the second center point with each other and allocate the score on the basis of the comparing result. The third allocating portion acquires a first average distance value between a first center pixel positioned at the center of the data region and at least one adjacent pixel positioned adjacent to the first center pixel and compares the acquired first average distance value and the second average distance value previously determined through the prior learning by the training images with each other and allocate the score on the basis of the comparing result. The fourth allocating portion acquires a third average distance value between a second center pixel positioned at the center of the background region and at least one adjacent pixel positioned adjacent to the second center pixel and compares the acquired third average distance value and the second average distance value with each other and allocate the score on the basis of the comparing result.

The second score allocating portion 121b generates a histogram related to brightness for each detected ROI and allocates the score for each detected ROI according to a distance difference between peaks in the generated histogram.

The third score allocating portion 121c grants a weight value for each of the features displaying the data region through the prior learning by the training images and reflects the weight value to the extracted features for each detected ROI and allocate the score by using the ROI is reflected the weight value.

The region selecting portion 122 selects the identifier region from the detected ROIs on the basis of the allocated score. The region selecting portion 122 includes a temporary identifier region detecting portion 122a and a region determining portion 122b.

The temporary identifier region detecting portion 122a detects a temporary identifier region depending on whether data regions having the same size are sequentially present by performing labeling for each detected ROI on the basis of the allocated score or detects the temporary identifier region depending on whether all successive data are included on the basis of a brightness value of the background region for each detected ROI on the basis of the allocated score. The temporary identifier region detecting portion 122a may determine whether all the successive data are included by searching a figure having a minimum size including all the successive data by applying an erosion algorithm for the background region or an edition algorithm for the background.

The region determining portion 122b determines the identifier region depending on whether or not the detected temporary identifier region coincides with a predetermined criterion.

However, the identifier region which coincides with the predetermined criterion may not be selected by the region selecting portion 122. In the exemplary embodiment, the vehicle identifier recognizing apparatus 100 may further include an image inverting unit 160 by considering the point. The image inverting unit 160 inverts the input image when the identifier region which coincides with the predetermined criterion is not selected. When the image inverting unit 160 inverts the input image, the ROI detecting unit 110 detects the ROIs again from the inverted image on the basis of the prior learning result.

Meanwhile, even in the inverted image, the identifier region which coincides with the predetermined criterion may not be selected. In the exemplary embodiment, the vehicle identifier recognizing apparatus 100 may further include an identifier region generating unit 170 by considering the point. The identifier region generating unit 170 combines the temporary identifier region selected by the temporary identifier region detecting portion 122a and the temporary identifier region acquired by signal-processing the input image with each other to generate the identifier region when the identifier region which coincides with the predetermined criterion is not selected from the inverted image. And, the identifier generating unit 170 generate the identifier region on the basis of the combining result.

The identifier recognizing unit 130 analyzes the identifier region selected according to a type of the selected identifier region and recognize the vehicle identifier on the basis of the analyzing result. The identifier recognizing unit 130 includes a component identifying portion 131 and a vehicle identifier recognizing portion 132 as shown in FIG. 2B.

The component identifying portion 131 identifies data positioned in the identifier region selected according to the type of the selected identifier region into at least two types of components. The component identifying portion 131 may identify data into a character string component and a figure string component.

The vehicle identifier recognizing portion 132 recognizes the vehicle identifier by using the identified components. The vehicle identifier recognizing portion 132 compares each of the identified components with previously stored components and recognize the vehicle identifier on the basis of the comparing result.

The power supply unit 140 supplies power to each of the components constituting the vehicle identifier recognizing apparatus 100.

The main control unit 150 controls an overall operation of each of the components constituting the vehicle identifier recognizing apparatus 100.

The vehicle identifier recognizing apparatus 100 may further include a training image analyzing unit 180. The training image analyzing unit 180 generates a common data region including common data among training images as the prior learning result by analyzing the training images which are different in at least one component of the content, location, and size of the vehicle identifier. The training image analyzing unit 180 includes a common data region defining portion 181, a common data region extracting portion 182, a feature component extracting portion 183, and a prior learning result generating portion 184 as shown in FIG. 2C.

The common data region defining portion 181 compares and analyzes the training images which are different in at least one component of the content, location, and size of the vehicle identifier and defines a common data region including characters or figures.

The common data region extracting portion 182 extracts the common data region defined for each of the training images. The common data region extracting portion 182 extracts common data regions defined as different sizes for each of the training images and thereafter, normalizes the sizes of the extracted common data regions and transmit the common data region extracted by the feature component extracting portion 183.

The feature component extracting portion 183 extracts a feature component from the extracted common data region. The feature component extracting portion 183 may extract a feature vector as the feature component. The feature component extracting portion 183 may use modified censors transform (MCT) or Haar-like feature at the time of extracting the feature component. However, in the exemplary embodiment, extracting the feature component is not limited to such an algorithm.

The prior learning result generating portion 184 generates the prior learning result including successive character strings or successive figure strings on the basis of the extracted feature component. The prior learning result generating portion 184 may use an adaboosting algorithm at the time of generating the prior learning result.

The training image analyzing unit 180 may further include a background region processing portion 185. The background region processing portion 185 extracts the background region without the common data region extracted for each of the training images and normalizes the size of the extracted background region.

The vehicle identifier recognizing apparatus 100 may further include an identifier region type determining unit 190. The identifier region type determining unit 190 determines the type of the identifier region selected by considering a ratio between a width value and a length value of the selected identifier region.

Next, the vehicle identifier recognizing apparatus 100 will be described as an exemplary embodiment. The following description refers to FIGS. 1 and 3.

Figure 3:
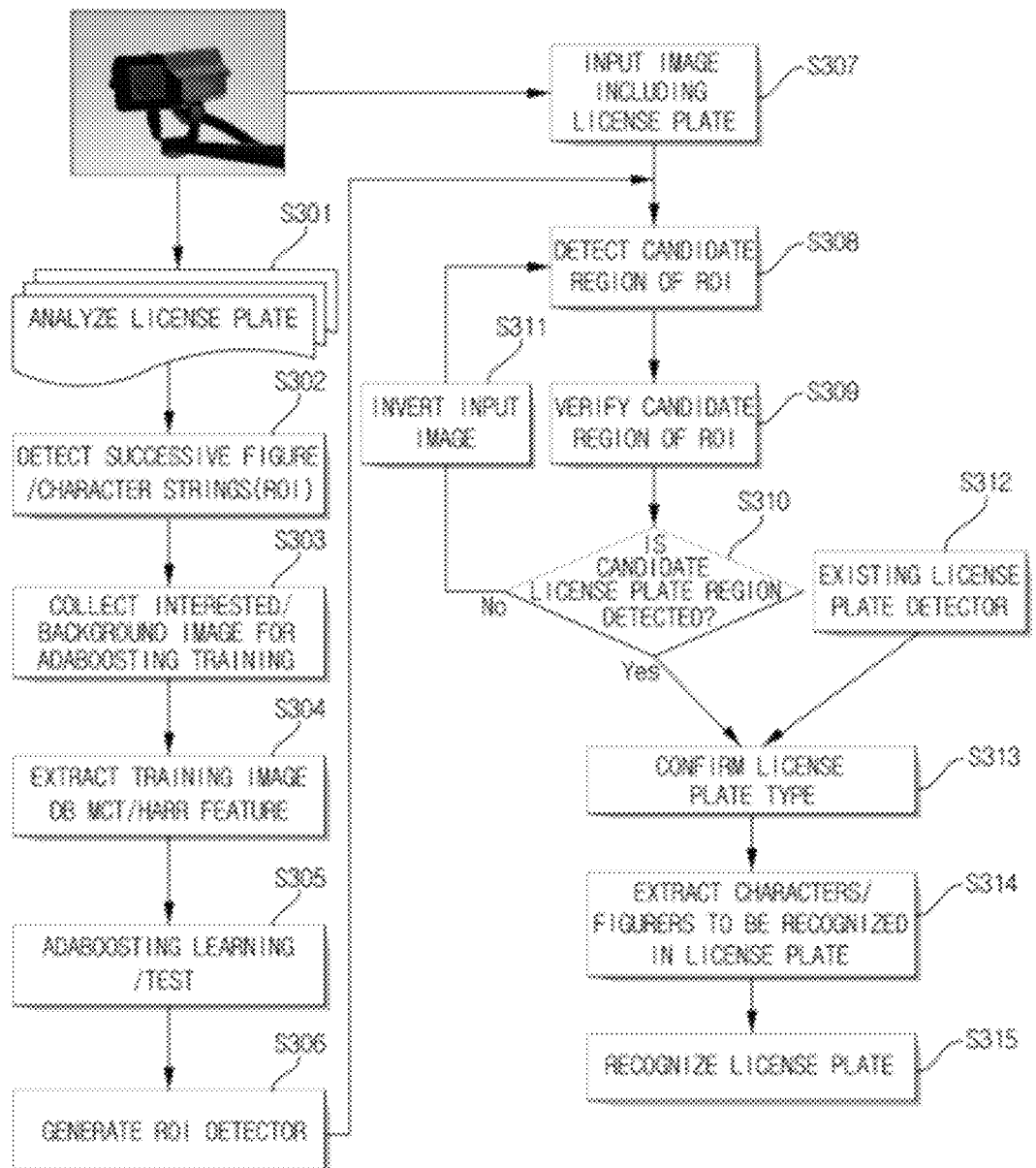
FIG. 3 is a diagram showing an exemplary embodiment of the apparatus for recognizing an identifier of a vehicle.

The vehicle identifier recognizing apparatus 100 first detects predetermined character and figure parts constituting the license plate in a natural image through learning regardless of a shape of the license plate and detects the entire license plate region on the basis of the detected character and figure parts, which are amalgamated with the existing license plate detecting method so as to automatically detect and recognize various types of license plates. Hereinafter, in the exemplary embodiment, there is disclosed a method of defining figure or character strings commonly and successively shown in various types of license plate regions and allowing the defined figure or character string to be learned through the adaboosting technique in order to detect the license plate. This is described through a stepwise flowchart as shown in FIG. 3.

Figure 4:
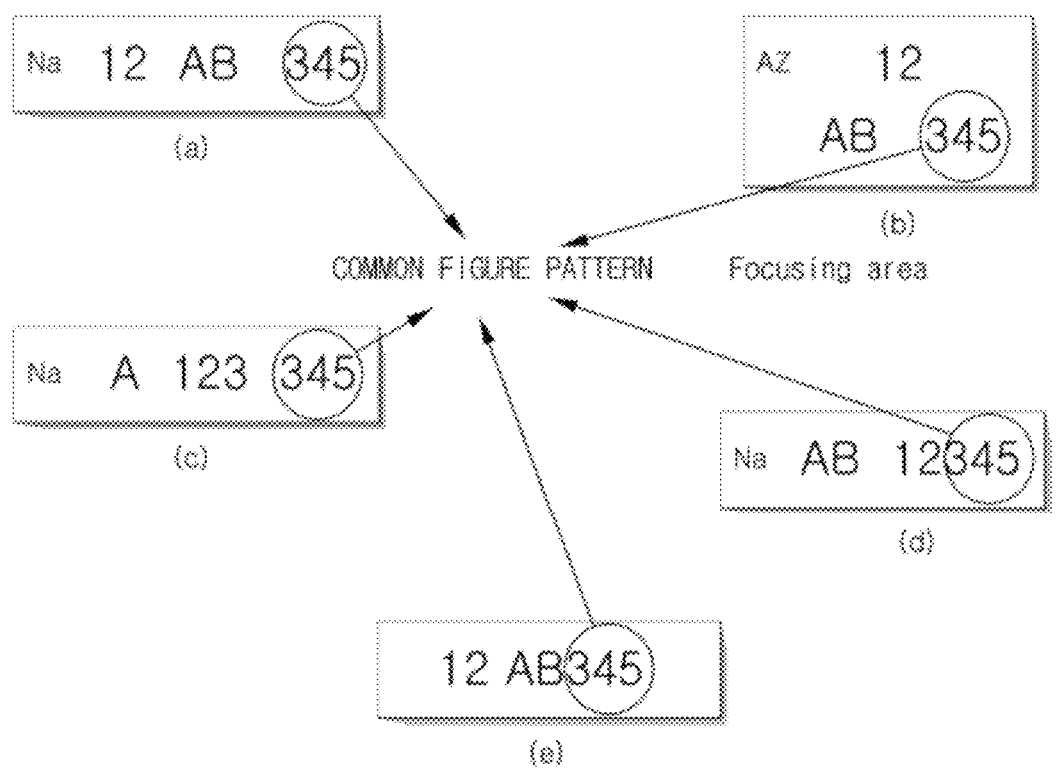
FIG. 4 is a diagram showing various types of European automobile license plates.
Figure 5:
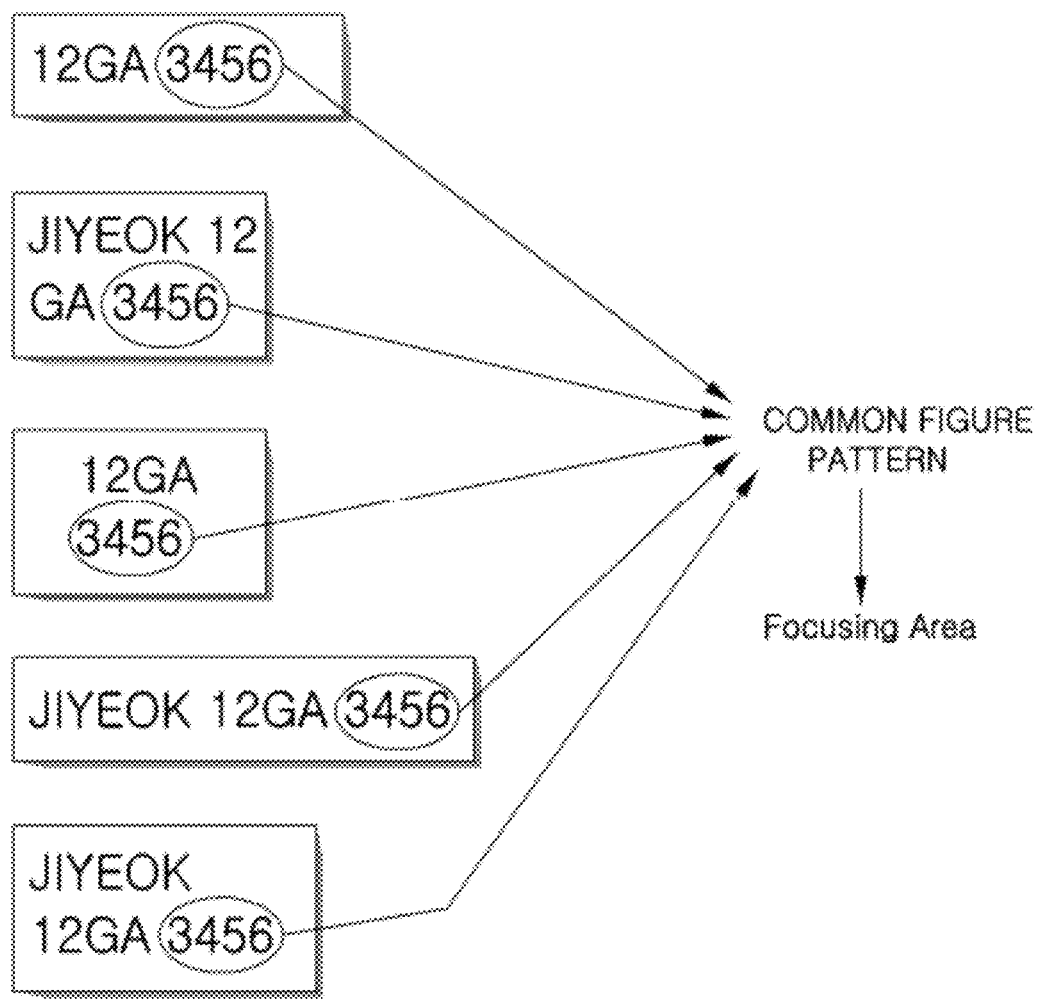
FIG. 5 is a diagram showing various types of Korean automobile license plates.

First, in step S301, a license plate form for each country is analyzed. In FIG. 1, this function is performed by the training image analyzing unit 180. For example, European license plates shown in FIG. 4 mainly feature two types of (a) and (b), but may have various types of license plates which are slightly modified, such as (c), (d), and (e). In this case, when structures of various types of license plates are analyzed, three figure strings are successively shown in the last right part of the license plate at all times. Further, Korean license plates shown in FIG. 5 include various new and old styles of license plates, but similarly, four figure strings are successively shown in the last right part. As such, figure or character strings commonly shown in various types of license plates to be found are defined as the ROI. In FIG. 2, this function is performed by the common data region defining portion 181.

In step S303, a lot of learning data are generated by manually extracting ROIs having various sizes from various input images in step S302, and thereafter, sizes of the learning data are normalized for training. In FIG. 2, this function is performed by the common data region extracting portion 182. Meanwhile, even a general background part other than the ROI is subjected to the same method for adaboosting learning. In FIG. 2, this function is performed by the background region processing portion 185.

In step S304, the modified censors transform (MTC) is applied or the harr-like feature is extracted in order to extract the feature from the inputted ROI. In this case, other features capable of expressing the ROI more completely may be used. In FIG. 2, this function is performed by the feature component extracting portion 183.

In step S305, learning of the feature vector of the ROI and the feature vector of the background region which are extracted is completed through a cascading step of the adaboosting technique.

When learning is completed, a detector for successive figure string/character strings known as the ROI is finally generated in step S306. In FIG. 2, this function is performed by the prior learning result generating portion 184.

In step S307, an image including the license plate is, in practice, inputted in real time. When the input image is captured by a camera, the ROI detector generated in step S306 detects candidate ROIs while scanning the entire image as shown in step S308. In this case, the detector may detect approximately up to 1 to 5 candidate ROIs in the entire image. In FIG. 1, this function is performed by the ROI detecting unit 110.

The entire input image including only one license plate is inputted under an environment of the general license plate recognizing system. However, since up to 2 to 3 license plate regions may be included in the input image according to the viewing angle or resolution of the camera or application thereof, the following conditions are examined in step S309 in order to detect only the license plate region from the detected candidate ROI in the exemplary embodiment. In the exemplary embodiment, this function is performed by the score allocating portion 121 of FIG. 2.

Condition 1: The candidate ROI is binarized using an OTSU algorithm. Thereafter, the score is allocated by calculating Fisher's discriminant rate (FDR) between the background region and the character region. In the exemplary embodiment, this function is performed by the first allocating portion of the first score allocating portion 121*a*.

Condition 2: The candidate ROI is binarized using the OTSU algorithm. Thereafter, the center points of the background region and the character region are acquired. Thereafter, a distance between both center points and distances between both center points and the center point of the ROI are calculated and thereafter, the score is allocated depending on the license plate region or not. This condition is based on a fact that both the center point of the background part in the trained ROI and the center point of the character part are positioned at the center of the ROI. In the exemplary embodiment, this function is performed by the second allocating portion of the first score allocating portion 121*a*.

Condition 3: The candidate ROI is binarized using the OTSU algorithm. Thereafter, the center points of the background region and the candidate region are acquired. In addition, an average and a standard deviation of distances between the center points of the background regions and background pixels are acquired and an average and a standard deviation of distances between the center points of the character regions and character pixels are also acquired. Thereafter, the values are compared with the average values of the ROI which are previously acquired through learning so as to allocate the score. In the exemplary embodiment, this function is performed by the third allocating portion and the fourth allocating portion of the first score allocating portion 121*a*.

Condition 4: Brightness histogram of the entire ROI is generated. Thereafter, the score depending on the license plate region is allocated by evaluating a shape of the histogram. In this case, a shape of the histogram in a general license plate region is generally based on a fact that two peaks are spaced apart from each other by a predetermined distance or more. In the exemplary embodiment, this function is performed by the second score allocating portion 121*b*.

Condition 5: Various features to be other license plate regions are extracted. Thereafter, accuracy is evaluated using each of the features and thereafter, each accuracy is allocated as the weight value. In this case, the sum of the weight values is 0. When the total score is equal to or more than a predetermined value, the corresponding region is judged as the license plate region. In the exemplary embodiment, this function is performed by the third score allocating portion 121*c*.

$$\text{Total\_Score} = W_1 \times \text{Score}_1 + W_2 \times \text{Score} + W_3 \times \text{Score}_3 + \ldots + W_N \times \text{Score}_N \text{ (however, } 1.0 = W_1 + W_2 + W_3 + \ldots + W_N)$$

The candidate regions verified by the above conditions are selected in the order in which the score is large according to applications. In general, assuming that three or more license plates are not inputted into the input image, three license plates are selected to the maximum. In the exemplary embodiment, this function is performed by the region selecting portion 122 of FIG. 2.

When verification of the ROIs is terminated, an actual license plate region based on the ROI is found. In this case, it may be assumed that the ROI found through basic assumption is the last third place of the actual license plate region, but in some cases, the ROI may often be detected in first places or middle places including characters. Therefore, even though the ROI is allocated in an incorrect location, the ROI is allocated to include the entire license plate region by using the ratio between the width and the length of the ROI. Two examples of the ROI depending on the European license plate type may be shown in FIG. 6.

The minimum bounding rectangle (MBR) of the final license plate is determined by using a method of verifying whether the character regions having the same size are sequentially present after performing binarizing in the ROI and performing labeling when the ROI is allocated and a method of finding a minimum rectangle including all figures and characters of the license plate by using the edition and erosion algorithm of the background on the basis of the brightness value of the background part in the ROI. In FIG. 2, this function is performed by the temporary identifier region detecting portion 122*a* and the region determining portion 122*b*.

In the case where there is no candidate license plate region found in step S310, since in step S311, there is a possibility that patterns of the background and the characters of the license plate which are previously learned will be reversed in the corresponding license plate, steps S308 to S310 are repetitively performed by inverting the input image. In FIG. 1, this function is performed by the image inverting unit 160.

Meanwhile, license plates which cannot be found may be present in spite of inverting the input image. Therefore, in step S312, the candidate license plate region is established by adding up the MBR region of the license plate found in step S310 and the MBR region of the license plate found through the existing signal processing method. In step S312, since different features and a license plate extracting result acquired by using a classifier are combined with each other, it is possible to offset a demerit of each method. In FIG. 1, this function is performed by the identifier region generating unit 170.

In step S313, the license plate type is determined through the width-length ratio of the candidate license plate region acquired in steps S310 and S312. That is, the candidate license plate region is divided into a long one-line license plate type and a short two-line license plate type. In FIG. 1, this function is performed by the identifier region type determining unit 190.

When the license plate type is determined in step S313, the character string and the figure string to be recognized are separated from each other according to each license plate type. In general, when the license plate type is determined, the location of the character or the figure is substantially constant, and as a result, the character or figure region is found at a fixed location. In FIG. 2, this function is performed by the component identifying portion 131.

Lastly, in step S314, predetermined characters and figures are compared with character or figure data learned through a neural network, and the like to be recognized. In FIG. 2, this function is performed by the vehicle identifier recognizing portion 132.

Figure 7:
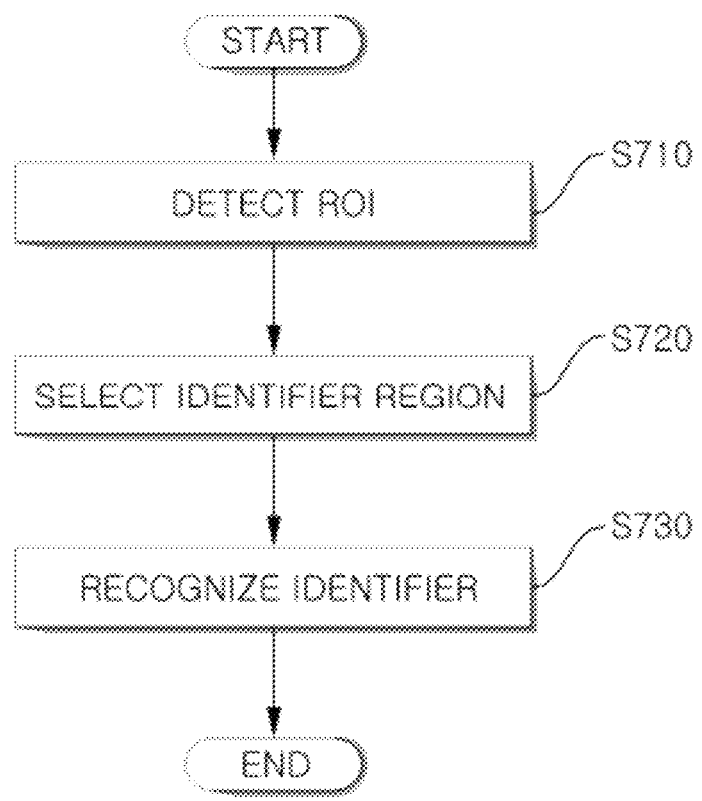
FIG. 7 is a flowchart showing a method for recognizing an identifier of a vehicle according to an exemplary embodiment of the present invention.

Next, a vehicle identifier recognizing method of the vehicle identifier recognizing apparatus 100 will be described. FIG. 7 is a flowchart showing a vehicle identifier recognizing method according to an exemplary embodiment of the present invention. The following description refers to FIG. 7.

First, the ROI detecting unit 110 detects the ROIs from the input image on the basis of the prior learning result by the training images (detecting the ROI, S710). The ROI detecting unit 110 may detect 2 to 5 ROIs for each input image. The ROI detecting unit 110 determines the size of the ROI to be detected by considering a ratio of a predetermined width value and a predetermined height value at the time of detecting the ROI.

Thereafter, the identifier region selecting unit 120 selects the identifier region including the identifier of the vehicle from ROIs detected according to a predetermined criterion (selecting the identifier region, S720).

The selecting of the identifier region may include score allocating and region selecting. In the allocating of the score, the score allocating portion 121 allocates the score for each of the ROIs detected according to the predetermined criterion. In the selecting of a region, the region selecting portion 122 selects the identifier region among the ROIs detected on the basis of the allocated score.

In the allocating of the score, at least one of first score allocating, second score allocating, and third score allocating is performed. In the first score allocating, the score is allocated to each of the detected ROIs by considering the relationship between a data region including data and a background region without data.

In the second score allocating, a histogram related to brightness is generated for each detected ROI and the score for each detected ROI is allocated according to a distance difference between peaks in the generated histogram. In the third score allocating, a weight value is granted for each of features displaying the data region through the prior learning by the training images and the weight value is reflected to the extracted features for each detected ROI to allocate the score. In the third score allocating, the score is allocated by using the ROI is reflected the weight value.

Meanwhile, in the first score allocating, at least one of first allocating to fourth allocating is performed. In the first allocating, the score is allocated by calculating a region discriminating value between the data region and the background region. In the second allocating, a first center point of the data region and a second center point of the background region are acquired and a distance difference between a third center point of an ROI including the data region and the background region and the first center point and a distance difference between the third center point and the second center point are compared with each other to allocate the score. In the third allocating, a first average distance value between a first center pixel positioned at the center of the data region and at least one adjacent pixel positioned adjacent to the first center pixel is acquired and the acquired first average distance value and the second average distance value previously determined through the prior learning by the training images are compared with each other to allocate the score. In the fourth allocating, a third average distance value between a second center pixel positioned at the center of the background region and at least one adjacent pixel positioned adjacent to the second center pixel is acquired and the acquired third average distance value and the second average distance value are compared with each other to allocate the score.

The selecting of the region may include temporary identifier region detecting and region determining. In the detecting of the temporary identifier region, a temporary identifier region is detected depending on whether data regions having the same size are sequentially present by performing labeling for each detected ROI on the basis of the allocated score or the temporary identifier region is detected depending on whether all successive data are included on the basis of a brightness value of the background region for each detected ROI on the basis of the allocated score. In the determining of the region, the region determining portion 122b determines the identifier region depending on whether the detected temporary identifier region coincides with the predetermined criterion.

Meanwhile, when the identifier region which coincides with the predetermined criterion is not determined, the image inverting unit 160 inverts the input image (image inverting). The inverting of the image may be performed after the region determining. Further, thereafter, the identifier region generating unit 170 combines the temporary identifier region selected by the temporary identifier region detecting portion 122a and the temporary identifier region acquired by signal-processing the input image with each other to generate the identifier region when the identifier region which coincides with the predetermined criterion is not selected from the inverted image (identifier region generating). The generating of the identifier region may be performed after the image inverting.

Thereafter, the identifier recognizing unit 130 analyzes the identifier region selected according to a type of the selected identifier region and recognize the vehicle identifier on the basis of the analyzing result (identifier recognizing, S730). The recognizing of the identifier may include component identifying and vehicle identifier recognizing. In the identifying of the component, the component identifying portion 131 identifies data positioned in the identifier region selected according to the type of the selected identifier region into at least two types of components. The component identifying portion 131 identifies data into a character string component and a figure string component. In the recognizing of the vehicle identifier, the vehicle identifier recognizing portion 132 recognizes the vehicle identifier by using the identified components. The vehicle identifier recognizing portion 132 compares each of the identified components with previously stored components to recognize the vehicle identifier.

In this method, before the detecting of the ROI (S710), the training image analyzing unit 180 may generate a common data region including common data between the training images as the prior learning result by analyzing the training images which are different from each other in at least one component of the content, location, and size of the vehicle identifier (training image analyzing).

The analyzing of the training image includes common data region defining, common data region extracting, feature component extracting, and prior learning result generating. In defining of the common data region, the common data region defining portion 181 compares and analyzes the training images which are different in at least one component of the content, location, and size of the vehicle identifier and defines a common data region including characters or figures. In the extracting of the common data region, the common data region extracting portion 182 extracts the common data region defined for each of the training images. The common data region extracting portion 182 extracts the defined common data regions having different sizes for each of the training images and normalizes the size of the extracted common data region. In the extracting of the feature component, the feature component extracting portion 183 extracts the feature component from the extracted common data region. In the generating of the prior learning result, the prior learning result generating portion 184 generates the prior learning result including successive character strings or successive figure strings on the basis of the extracted feature component.

Meanwhile, in the exemplary embodiment, the background region processing portion 185 may extract the background region without the common data region extracted for each of the training images and may normalize the size of the extracted background region (background region processing). The processing of the background region may be performed between the extracting of the common data region and the extracting of the feature component. However, the processing of the background region is not limited thereto in the exemplary embodiment. The processing of the background region may be performed between the extracting of the feature component and the generating of the prior learning result.

Meanwhile, in the exemplary embodiment, the identifier region type determining unit 190 may determine the type of the selected identifier region by considering the ratio between the width value and the length value of the selected identifier region (identifier region type determining). The determining of the identifier region type may be performed between the selecting of the identifier region and the recognizing of the identifier.

The present invention may be applied to an apparatus for recognizing an automobile license plate or an intelligent transport system (ITS).

The spirit of the present invention has been just exemplified. It will be appreciated by those skilled in the art that various modifications, changes, and substitutions can be made without departing from the essential characteristics of the present invention. Accordingly, the embodiments disclosed in the present invention and the accompanying drawings are used not to limit but to describe the spirit of the present invention. The scope of the present invention is not limited only to the embodiments and the accompanying drawings. The protection scope of the present invention must be analyzed by the appended claims and it should be analyzed that all spirits within a scope equivalent thereto are included in the appended claims of the present invention.

What is claimed is:

1. An apparatus for recognizing an identifier of a vehicle comprising:
   a processor; and
   a non-transitory computer-readable storage medium having
      an ROI detecting unit detecting ROIs from an input image on the basis of a prior learning result by images for training,
      an identifier region selecting unit selecting the identifier region including the identifier of the vehicle from ROIs detected according to a predetermined criterion,
      an identifier recognizing unit analyzing the identifier region selected according to a type of the selected identifier region to recognize the vehicle identifier, and
      a training image analyzing unit generating a common data region including common data among training images as the prior learning result by analyzing the training images which are different in at least one component of the content, location, and size of the identifier, wherein the training image analyzing unit includes
         a common data region defining portion comparing and analyzing the training images which are different in the components and defining the common data region including characters or figures,
         a common data region extracting portion extracting the common data region defined for each of the training images,
         a feature component extracting portion extracting a feature component from the extracted common data region, and
         a prior learning result generating portion generating the prior learning result including successive character strings or successive figure strings on the basis of the extracted feature component.

2. The apparatus of claim 1, wherein the common data region extracting portion extracts common data regions defined as different sizes for each of the training images and thereafter, normalizes the sizes of the extracted common data regions to transmit the common data region extracted by the feature component extracting portion.

3. The apparatus of claim 1, wherein the training image analyzing unit further includes a background region processing portion extracting the background region without the common data region extracted for each of the training images and normalizing the size of the extracted background region.

4. The apparatus of claim 1, wherein the ROI detecting unit detects 2 to 5 ROIs for each input image.

5. The apparatus of claim 1, wherein the ROI detecting unit determines the size of an ROI to be detected by considering a ratio of a predetermined width value and a predetermined height value at the time of detecting the ROI.

6. The apparatus of claim 1, wherein the non-transitory computer-readable storage medium includes an identifier region type determining unit determining the type of the selected identifier region by considering a ratio between a width value and a length value of the selected identifier region.

7. The apparatus of claim 1, wherein the identifier region selecting unit includes a score allocating portion allocating a score to each of the detected ROIs according to a predetermined criterion, and
a region selecting portion selecting the identifier region from the detected ROIs on the basis of the allocated score.

8. The apparatus of claim 7, wherein the score allocating portion includes at least one of
   a first score allocating portion allocating the score to each of the detected ROIs by considering the relationship between a data region including data and a background region without data,
   a second score allocating portion generating a histogram related to brightness for each detected ROI and allocating the score for each detected ROI according to a distance difference between peaks in the generated histogram, and
   a third score allocating portion granting a weight value for each of features displaying the data region through the prior learning by the training images and reflecting the weight value to the extracted features for each detected ROI to allocate the score.

9. The apparatus of claim 8, wherein the first score allocating portion includes at least one of
   a first allocating portion allocating the score by calculating a region discriminating value between the data region and the background region,
   a second allocating portion acquiring a first center point of the data region and a second center point of the background region and comparing a distance difference between a third center point of an ROI including the data region and the background region and the first center point and a distance difference between the third center point and the second center point with each other to allocate the score,
   a third allocating portion acquiring a first average distance value between a first center pixel positioned at the center of the data region and at least one adjacent pixel positioned adjacent to the first center pixel and comparing the acquired first average distance value and the second average distance value previously determined through the prior learning by the training images with each other to allocate the score, and
   a fourth allocating portion acquiring a third average distance value between a second center pixel positioned at the center of the background region and at least one adjacent pixel positioned adjacent to the second center pixel and comparing the acquired third average distance value and the second average distance value with each other to allocate the score.

10. The apparatus of claim 7, wherein the region selecting portion includes
   a temporary identifier region detecting portion detecting a temporary identifier region depending on whether data regions having the same size are sequentially present by performing labeling for each detected ROI on the basis of the allocated score or detecting the temporary identifier region depending on whether all successive data are included on the basis of a brightness value of the background region for each detected ROI on the basis of the allocated score, and
   a region determining portion determining the identifier region depending on whether or not the detected temporary identifier region coincides with a predetermined criterion.

11. The apparatus of claim 10, wherein the non-transitory computer-readable storage medium includes an image inverting unit inverting the input image when the identifier region which coincides with the predetermined criterion is not selected.

12. The apparatus of claim 11, wherein the non-transitory computer-readable storage medium includes an identifier region generating unit combining the temporary identifier region selected by the temporary identifier region detecting portion and the temporary identifier region acquired by signal-processing the input image with each other to generate the identifier region when the identifier region which coincides with the predetermined criterion is not selected from the inverted image.

13. An apparatus for recognizing an identifier of a vehicle comprising:
  a processor; and
  a non-transitory computer-readable storage medium having
    an ROI detecting unit detecting ROIs from an input image on the basis of a prior learning result by images for training,
    an identifier region selecting unit selecting the identifier region including the identifier of the vehicle from ROIs detected according to a predetermined criterion, and
    an identifier recognizing unit analyzing the identifier region selected according to a type of the selected identifier region to recognize the vehicle identifier, wherein the identifier recognizing unit includes
      a component identifying portion identifying data positioned in the identifier region selected according to the type of the selected identifier region into at least two types of components, and
      a vehicle identifier recognizing portion recognizing the vehicle identifier by using the identified components.

14. The apparatus of claim 13, wherein the component identifying portion identifies the data into a character string component and a figure string component, and the vehicle identifier recognizing portion compares each of the identified components with previously stored components to recognize the vehicle identifier.

15. The apparatus of claim 13, wherein the non-transitory computer-readable storage medium apparatus includes a training image analyzing unit generating a common data region including common data among training images as the prior learning result by analyzing the training images which are different in at least one component of the content, location, and size of the identifier.

16. The apparatus of claim 13, wherein the ROI detecting unit determines the size of an ROI to be detected by considering a ratio of a predetermined width value and a predetermined height value at the time of detecting the ROI.

17. The apparatus of claim 13, wherein the non-transitory computer-readable storage medium includes an identifier region type determining unit determining the type of the selected identifier region by considering a ratio between a width value and a length value of the selected identifier region.

18. A method for recognizing an identifier of a vehicle, comprising:
  detecting ROIs from an input image on the basis of a prior learning result by images for training;
  selecting the identifier region including the identifier of the vehicle from ROIs detected according to a predetermined criterion;
  analyzing the identifier region selected according to a type of the selected identifier region to recognize the vehicle identifier; and
  recognizing the identifier, wherein the recognizing of the identifier includes
    identifying data positioned in the identifier region selected according to the type of the selected identifier region into at least two types of components, and
    recognizing the vehicle identifier by using the identified components.

19. The method of claim 18, further comprising generating a common data region including common data among training images as the prior learning result by analyzing the training images which are different in at least one component of the content, location, and size of the vehicle identifier.

20. The method of claim 18, wherein the selecting of the identifier region includes
  allocating a score to each of the detected ROIs according to a predetermined criterion, and
  selecting the identifier region from the detected ROIs on the basis of the allocated score.

* * * * *